United States Patent

[11] 3,601,150

[72] Inventor Akio Mito
  Tokyo, Japan
[21] Appl. No. 5,294
[22] Filed Jan. 23, 1970
[45] Patented Aug. 24, 1971
[73] Assignee Kabushikikaisha Tokyo Keiki Seizosho
  (Tokyo Keiki Seizosho Co., Ltd.)
  Tokyo, Japan
[32] Priority Jan. 27, 1969, Jan. 28, 1969, Jan. 27, 1969
[33] Japan
[31] 44/5899, 44/7484 and 44/5900

[54] FLOW CONTROL VALVE
  6 Claims, 11 Drawing Figs.
[52] U.S. Cl. .................................................. 137/501
[51] Int. Cl. ............................................. F16k 17/22,
  F16k 31/163
[50] Field of Search ............................................ 137/501,
  495, 504, 605, 606, 88, 3

[56] References Cited
UNITED STATES PATENTS

| | | | |
|---|---|---|---|
| 2,707,964 | 5/1955 | Monroe | 137/88 X |
| 2,843,141 | 7/1958 | Arnot et al. | 137/501 X |
| 3,100,496 | 8/1963 | Reiser | 137/605 X |
| 3,502,100 | 3/1970 | Jonson | 137/501 X |
| 3,524,386 | 8/1970 | Cudnohufsky | 137/501 X |

Primary Examiner—Alan Cohan
Assistant Examiner—Robert J. Miller
Attorney—Hill, Sherman, Meroni, Gross & Simpson ABSTRACT: A flow control valve having a branch duct line provided in a duct line interconnecting a flow control unit with a pressure adjustment unit, and a throttle inserted in the branch duct line thereby to permit constant supply of a suitable amount of a fluid to the pressure adjustment unit.

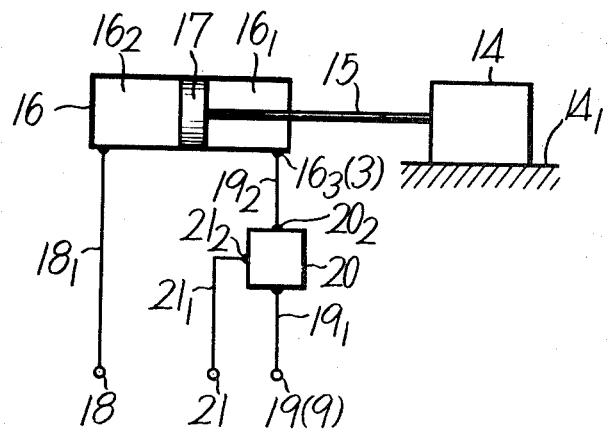
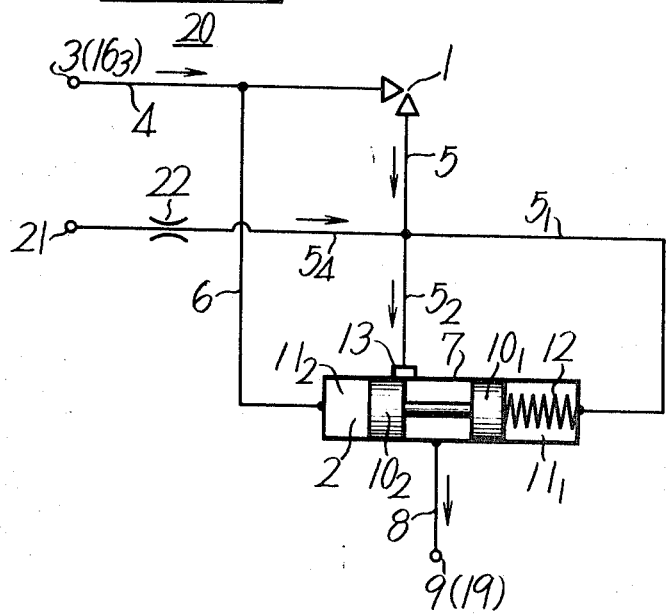

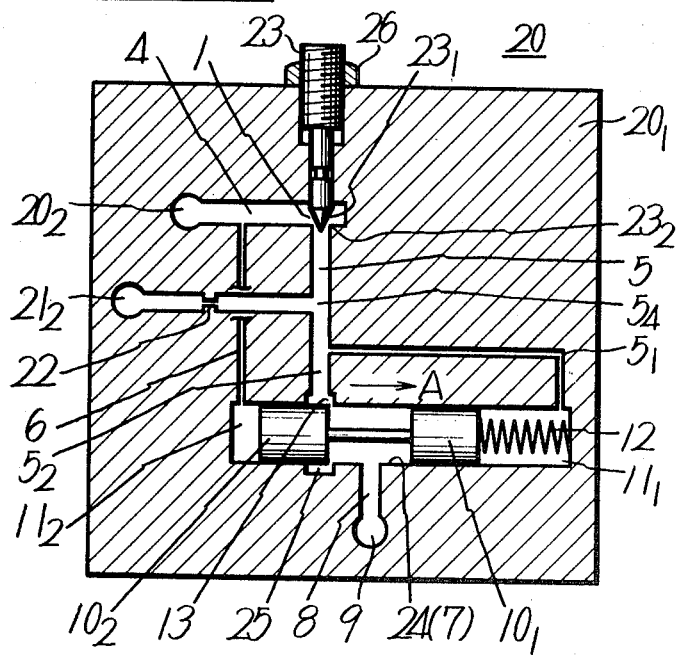
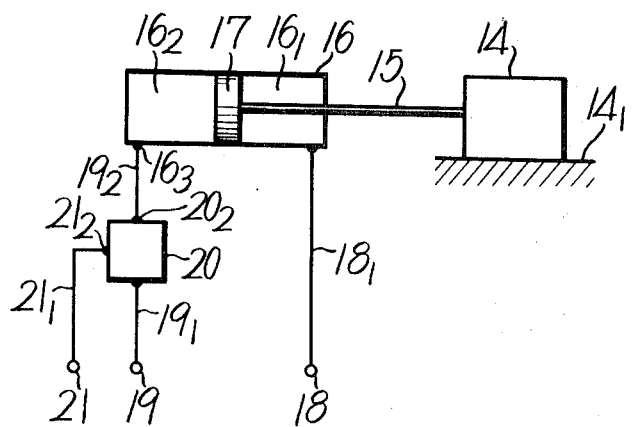

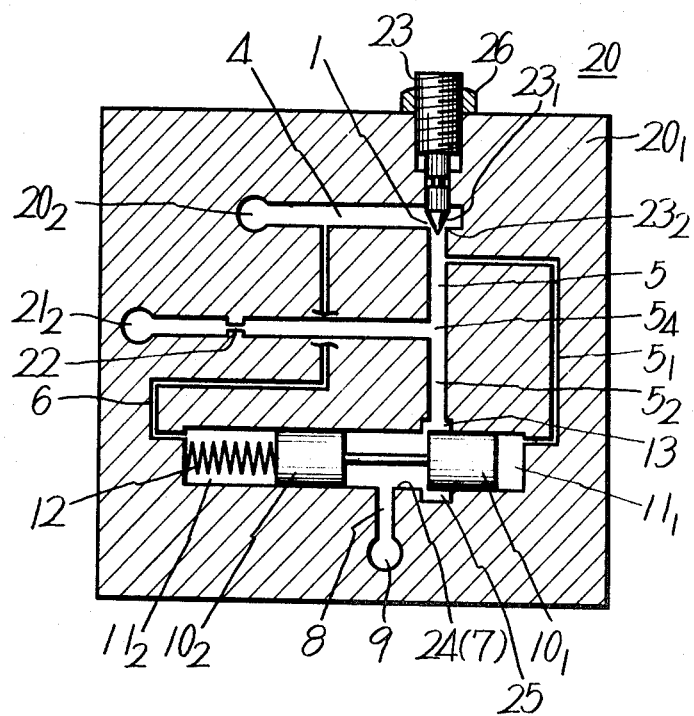

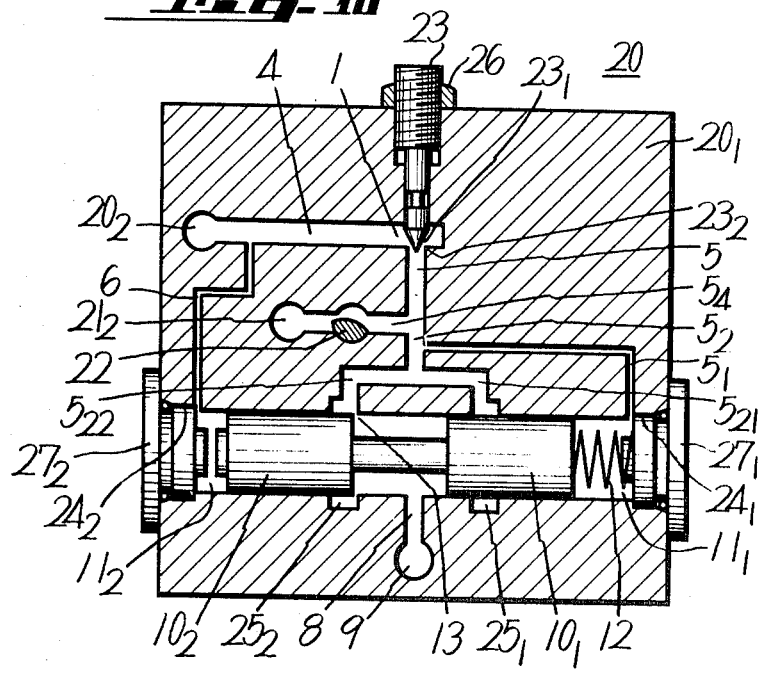
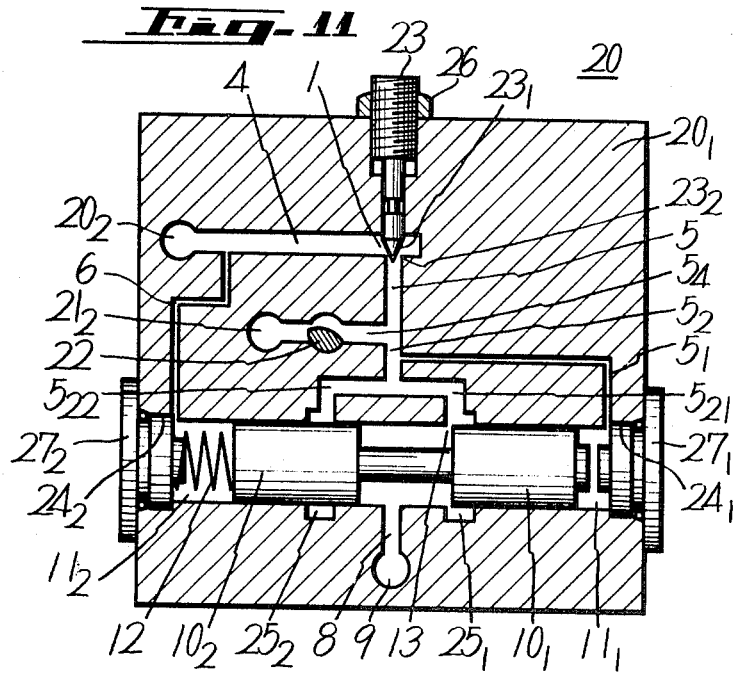

3,601,150

FLOW CONTROL VALVE

BACKGROUND OF THE INVENTION

1. Field of the Invention

This invention relates to a flow control valve which is capable of accurate and stable control operation in the domain of minute flow, too.

2. Description of the Prior Art

The flow Q of a fluid flowing through an orifice is generally given by the following equation.

$$Q = CA \sqrt{\frac{2g(p_1 - p_2)}{r}}$$

where A is the cross-sectional area of the orifice, $p_1$ and $P_2$ pressures of the fluid before and behind the orifice respectively, $r$ the specific gravity and C a flow coefficient peculiar to the orifice.

Conventional types of flow control valves are broadly divisible into that which controls the flow of a fluid by adjustment of the cross-sectional area of the orifice in response to the variations in pressure of the fluid on the oncoming or offrunning side of the orifice and that which does not change the cross-sectional area of the orifice but maintains constant the flow of the fluid flowing the orifice by holding constant the difference between pressures of the fluid on the sides of the inlet and outlet in such a manner that when the pressure, for example, on the side of the inlet increases that on the side of the outlet is increased correspondingly.

The conventional flow control valve employed, for example, in a meter-out or meter-in circuit, that is, the flow control valve of the type which maintains a constant amount of fluid to flow by holding constant the difference between the pressures of the fluid before and behind the flow control portion of the flow control valve, consists of the flow control unit and a pressure adjustment unit. In the flow control valve the pressures of the fluid before and behind the flow control unit are led to the pressure adjustment unit to actuate it to hold constant the difference between the pressures of the fluid before and behind the flow control unit, but this prior art flow control valve has a fatal defect such as inaccuracy or incapability of control operation in the case of minute flow.

SUMMARY OF THE INVENTION

Accordingly, a primary object of this invention is to provide a flow control valve which is free from the aforementioned defect experienced in the conventional flow control valve, that is, accurate and stable in operation in the domain of minute flow which has been regarded as difficult functionally. BRIEF DESCRIPTION OF THE DRAWINGS FIG. 1 is a schematic duct line diagram of a conventional flow control valve;

FIG. 3 is a schematic diagram showing one example of a flow control valve of this invention as applied to a meter-out circuit of a hydraulic unit;

FIG. 4 is a schematic duct line diagram of the flow control valve of this invention depicted in FIG. 3;

FIG. 5 is an enlarged cross-sectional diagram of one concrete construction of the flow control valve of this invention;

FIG. 6 is a schematic diagram of the flow control valve of this invention when employed in a meter-in circuit of the hydraulic unit;

FIG. 9 is an enlarged cross-sectional view of one concrete example of the flow control valve of this invention which is used as illustrated in FIGS. 6 and 7; and FIGS. 10 and 11 are enlarged cross-sectional views of further concrete examples of the flow control valve of this invention.

DESCRIPTION OF THE PREFERRED EMBODIMENTS

Figure 1:
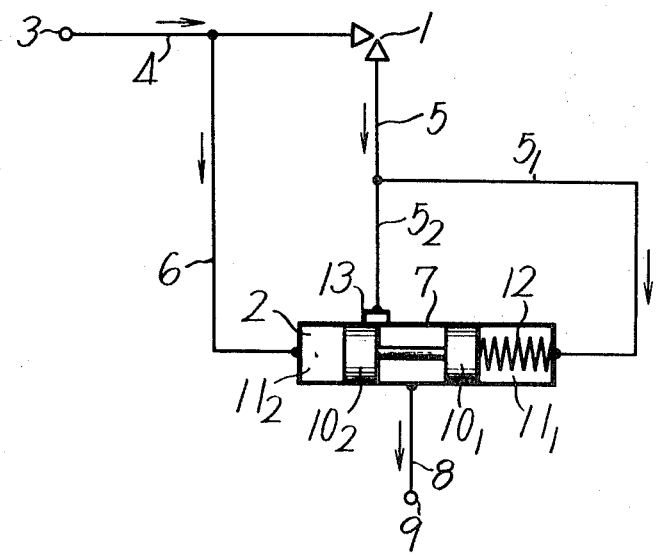
Figure 2:
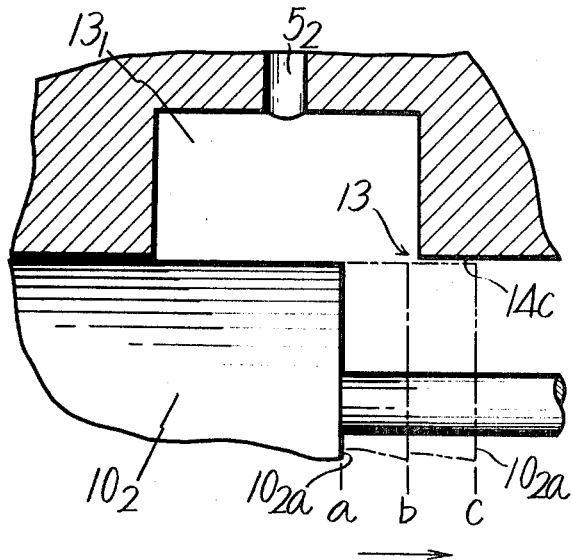
FIG. 2 is an enlarged cross-sectional view of a control throttle of a pressure adjustment unit of the device shown in FIG. 1.

With reference to FIGS. 1 and 2 a description will be given first of one example of a conventional flow control valve so as to facilitate a better understanding of this invention. The figures show the flow control valve as being applied to a meter-out circuit. Reference numeral 1 indicates a flow control unit in a prior stage, 2 a pressure adjustment unit in the following stage and 3 a pressurized oil supply or inlet port. The pressurized oil supplied from the inlet port 3 flows through duct lines 4 and 6 and through the flow control unit 1 into a cylinder 7 passing through duct lines 5, $5_2$ and $5_1$, from which the oil is led to an oil exhaust or outlet port 9 through a duct line 8. In the cylinder 7 there are provided pistons $10_1$ and $10_2$ formed as a unitary structure and oil rooms $11_1$ and $11_2$ are defined by the pistons and the cylinder 7. The oil rooms $11_1$ and $11_2$ have respectively connected thereto the duct lines $5_1$ and 6. When the opening of a throttle of the flow control unit, for example, a needle valve is diminished, the pressure of the oil in rear of the valve is decreased, that is, the oil pressure in the oil room $11_1$ becomes lower and hence the pressure adjustment unit 2, that is, the pistons $10_1$ and $10_2$ in the cylinder 7 are moved to right against the force of a spring 12 inserted in the oil room $11_1$, so that a control throttle 13 provided in the cylinder 7 is almost closed by one piston, for example, $10_2$. For a better understanding of the relationship between the piston $10_2$ and the control throttle 13, FIG. 2 shows on an enlarged scale the control throttle 13 of the pressure adjustment unit 2, that is, the cylinder 7 and its vicinity. Namely, the control throttle 13 is a room $13_1$ which is formed contiguous to the cylinder 7 and to which one end of the duct line $5_2$ is open. When the opening of the flow control unit 1 is decreased an end face $10_{2a}$ of the piston $10_2$ shifts from a position a to b in FIG. 2 correspondingly, and when the opening of the flow control unit 1 is further diminished the piston $10_2$, that is, its end face $10_{2a}$ further shifts to right to a position c due to a decrease in the pressure in the oil room $11_1$. Under such conditions, the oil flowing from the duct line $5_2$ into the room $13_1$ flows into the cylinder 7 through a narrow clearance $14_c$ between the piston $10_2$ and the cylinder 7. Decreasing further the opening of the flow control unit 1, the piston $10_2$ is further moved to right, the length of the clearance $14_c$ in the lengthwise direction of the cylinder 7 increases. The oil usually contains fine particles such as dust, oxides or the like, so that when the clearance $14_c$, through which the oil flows has become longer, the oil hardly flows through the clearance $14_c$ to render the control operation of the control throttle inaccurate and unstable, thus making its normal operation almost impossible.

FIG. 3 is a schematic circuit diagram of a cylinder drive device employing the flow control valve of this invention in a meter-out circuit. With reference to the figure one example of this invention will hereinbelow be described. Reference numeral 14 designates a load which slides on a sliding surface $14_1$ and is reciprocated by a piston 17 of a cylinder 16 through a piston rod 15. Reference numeral 18 indicates a pressurized oil inlet port for supplying an oil to the cylinder 16, 19 a return port corresponding to the exhaust or outlet port 9 in FIG. 1, 20 a flow control valve produced according to this invention, 21 a pressure oil inlet port for the flow control valve 20, and $18_1$, $19_1$, $19_2$ and $21_1$ duct lines interconnecting the elements of the above oil pressure unit. The flow control valve 20 of this invention is to control substantially constant the amount of oil flowing into the valve 20 through the duct line $18_1$, the oil room $16_2$, the oil room $16_1$ and the duct line $19_2$ from the oil inlet port 18.

Referring to FIG. 4 similar to FIG. 1, a detailed description will be given of the flow control valve 20 of this invention. In FIG. 4 elements similar to those in FIGS. 1 and 3 are identified by the same reference numerals. In the present invention a branch duct line $5_4$ is provided in the duct line 5 or $5_2$ interconnecting the flow control unit 1 and the pressure adjustment unit 2 and a throttle unit 22 is provided in the branch duct line $5_4$. The pressurized oil supply port 21 is connected to the control throttle 13 through the duct line 5 or $5_2$ and the branch duct line $5_4$, in which case a suitable amount of oil is always supplied to the control throttle 13 in response to the difference between the pressures of the oil before and behind the flow control unit 1. Namely, the control throttle 13 is required to be open large enough to permit the passage therethrough of such an amount of oil as would be flown into the control throttle 13 from the pressurized oil supply port 21 through the throttle unit 22, even though the opening of the control throttle is small. This is automatically carried out by the oil pressure transmitting to the oil rooms $11_1$ and $11_2$ through the duct lines $5_1$ and 6. Accordingly, the flow control valve 20 can be operated accurately and stably in the domain of minute flow by selecting the opening of the throttle unit 22 of the duct line $5_4$ to be such that the control throttle 13 is opened at least necessary for normal operation of the pressure adjustment unit 2.

FIG. 5 shows one concrete construction of the flow control valve 20 above described with FIGS. 3 and 4, in which similar reference numerals to those in FIG. 4 indicate similar elements. Reference numeral $20_1$ designates the flow control valve proper made of iron or the like, and an inlet $20_2$ of the oil to the flow control valve 20 provided in its proper $20_1$ is connected to the exhaust port $16_3$ of the oil room $16_1$ through the duct line $19_2$ depicted in FIG. 3 and is connected to the flow control unit 1 through the duct line 4 formed in the valve proper $20_1$. The pressurized oil supply port 21 for the flow control valve 20 leads through the duct line $21_1$ to the pressure oil inlet port $21_2$ formed in the valve proper $20_1$ and is further connected through the throttle unit 22 to the duct line 5 similarly formed in the valve proper $20_1$. Reference numeral 23 designates a screw making up an opening adjustment unit of the flow control unit 1, which screw is screwed into the valve proper $20_1$ and its conical top end $23_1$ reaches one end of the duct line 5 and constitutes the flow control unit 1 together with a valve seat $23_2$ provided at that end of the duct line 5. Reference numeral 24 identifies a slide hole having a groove 25 formed on its circumference which is formed in the valve proper $20_1$ and this slide hole 24 corresponds to the cylinder 7 in FIG. 4. In the slide hole 24 or the cylinder 7 the pistons $10_1$ and $10_2$ are inserted as a unitary structure, and the slide hole 24 (or the cylinder 7), the groove 25 and one piston $10_2$ constitute the pressure adjustment throttle 13 depicted in FIG. 4. The spring 12 is relatively weak, that is, low in spring constant and is placed in one oil room $11_1$, by means of which is determined the difference between the pressures of the oil before and behind the flow control unit 1. Reference numeral 26 indicates a locknut provided in association with the adjustment screw 23 for fixing the opening of the flow control unit 1.

In accordance with the present invention the branch oil path $5_4$ is provided in the duct line 5 or $5_2$ between the flow control unit 1 and the pressure adjustment unit 2 and the throttle 22 is provided in the branch oil path $5_4$ and the oil is supplied to the oil inlet port $21_2$ from the oil supply port 21 through the oil path $21_1$ and is further supplied to the independent oil path 5 or $5_2$ through the oil path $5_4$ and the throttle 22, as has been described in the foregoing. Consequently, the amount of oil passing through the pressure adjustment unit, that is, the pressure control throttle 13 is the sum of the amounts of oil flowing into the throttle 13 through the flow control unit 1 and the throttle 22. In order to permit the passage of the oil the flow of which is the sum of the two amounts of oil flow, the pressure control throttle 13 is required to open considerably. Namely, in the flow control valve 20 of this invention the opening of the pressure control throttle 13 is greater than that of the conventional one to such an extent as corresponding to the quantity of oil flowing into the valve 20 through the throttle 22 and however small the controlled flow may be, the opening of the pressure control throttle 13 is maintained to correspond to the quantity of oil flowing into the flow control valve 20 from the throttle 22, so that the valve 20 is always held in its normal condition, ensuring not to cause troubles such as flowing of oil through the clearance of the valve, clogging of the valve with foreign substances or the like. The operation of the flow control valve does not differ from that of the conventional one by the provision of the throttle 22 through the branch duct line $5_4$ such as above described.

In the event that the pressure in the oil room $16_1$ of the cylinder 16 depicted in FIG. 3 increases, the pressure in the duct line $19_2$, that is, 4 also increases with an increase in the pressure in the oil room $16_1$. Under such conditions, the difference between the pressures of the oil before and behind the flow control unit 1 continues to increase, but the difference between pressures exerted to the pistons $10_1$ and $10_2$ also increases, so that the pistons $10_1$ and $10_2$ are moved in a direction of the arrow A in FIG. 5 against the force of the spring 12 to decrease the opening of the pressure control throttle 13 (refer to FIG. 2 and the disclosure related thereto), thus returning the pressure difference of the oil before and behind the flow control unit 1 to its initial value. Accordingly, the flow rate through the control unit 1 is always held constant irrespective of the variations in the pressure in the oil room $16_1$, that is, in the pressure on the inlet side of the valve 20. Since the throttle 22 intercommunicates through the branch duct line $5_4$ with the duct line 5 whose pressure varies with a change in the pressure in the oil room $16_1$, the pressure difference before and behind the throttle 22 varies with the variations in the pressure in the duct line 5, but the amount of oil flowing into the duct line 5 from the throttle 22 is originally selected to be small, so that the pressure difference in the throttle 22 does not matter for the practical use of the flow control valve of this invention.

Referring now to FIGS. 6 to 9, a description will be given of the flow control valve 20 of this invention as being employed in a meter-in circuit.

The example shown in FIG. 6 is exactly the same as that exemplified in FIG. 3 except in that the flow control valve 20 of this invention is used in the meter-in circuit of a cylinder drive device. In FIG. 6 similar reference numerals to those in FIG. 3 indicate similar elements and they are identical in construction and operation, so that no detailed description will be repeated for the sake of brevity. In the example of FIG. 6 the flow control valve is used in the meter-in circuit of the cylinder drive device as set forth just above and hence in the figure the pressurized oil supply port 18, the return port 19 and the pressurized oil supply port 21 for the flow control valve 20 depicted in FIG. 3 are indicated by the same reference numerals, but these reference numeral respectively designate the return port, the pressurized oil supply port and the exhaust port. Namely, in the example of FIG. 6 reference numeral 18 designates the return port of the cylinder drive device, 19 the pressurized oil supply or inlet ports for the flow control valve 20 and the cylinder drive device and 21 the exhaust or outlet port of the oil from the flow control valve 20.

Figure 7:
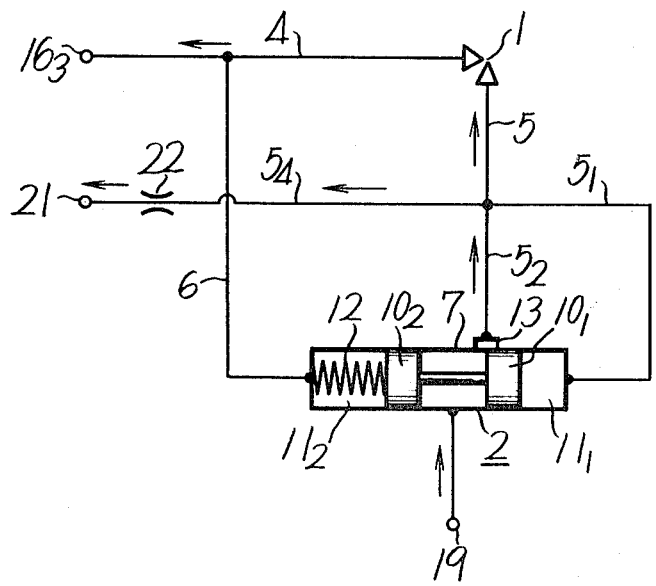
FIG. 7 is a schematic duct line diagram of the flow control valve of this invention depicted in FIG. 6.

FIG. 7 shows, similar to FIG. 4, the flow control valve of this invention which is employed in the meter-in circuit of the cylinder drive device as depicted in FIG. 6. Although the elements in FIG. 4 corresponding to those in FIG. 7 are designated by the same reference numerals, the pressurized oil flowing in the oil paths in FIG. 7 is opposite in direction to that (indicated by the arrows) in FIG. 4 (refer to the directions of the arrows in FIGS. 4 and 7), so that the relationships between the pressurized oil inlet and outlet ports in FIGS. 4 and 7 are opposite to each other as would be the case of FIGS. 3 and 6. In the example of FIG. 4 the spring 12 is placed in the right-hand oil room $11_1$, but in the example of FIG. 7 the spring 12 is disposed in the left-hand oil room $11_2$. Further, the control throttle 13 is provided in a manner to be controlled by the right-hand piston $10_1$.

Figure 8:
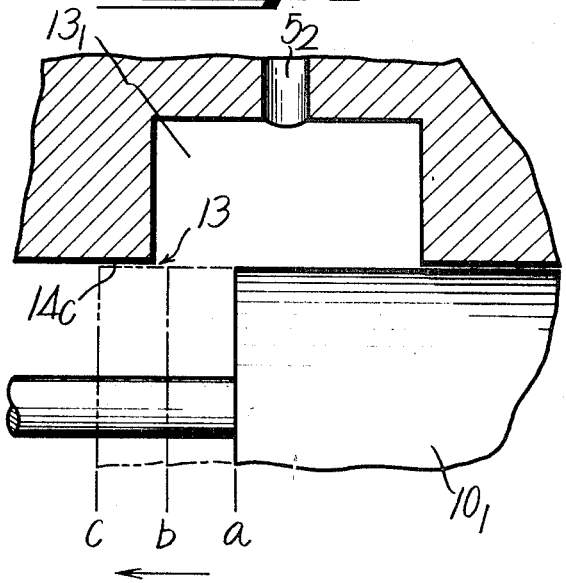
FIG. 8 is an enlarged cross-sectional view of the control throttle of a pressure adjustment unit of the flow control valve.

FIG. 8 shows the relationship between the piston $10_1$ and the room $13_1$ constituting the control throttle 13 in the example of FIG. 7 and this example is exactly identical in construction with that of FIG. 2 except in that the direction of the piston $10_1$ relative to the room $13_1$ is opposite to that in the latter example.

FIG. 9 illustrates one concrete construction, similar to FIG. 5, of the flow control valve 20 of this invention employed in the meter-in circuit of the device shown in FIGS. 6 to 8. The present example is exactly identical in construction with that of FIG. 5 except the direction of the flow of the pressurized oil, the location of the spring 12 and that of the control throttle 13 and similar elements in these examples are designated by the same reference numerals.

Since the embodiments of this invention illustrated in FIGS. 6 to 9 are exactly the same as those of FIGS. 3 to 5, no detailed description will be repeated and the flow of the oil passing through the control throttle 13 is the sum of two amounts of oil flowing through the flow control valve 1 and the throttle 22 as in the foregoing examples but the direction of the oil is opposite to that in the foregoing examples as set forth just above.

In the foregoing, when the flow control valve 20 of this invention is applied to the meter-out and meter-in circuits of the cylinder drive device, the spring 12 is placed in the oil room of the cylinder 7 at different positions and the pressure control throttle 13 is formed at different position with respect to the pistons, but the flow control valve of this invention may readily be applied to both the meter-in and meter-out circuits.

This will hereinbelow be described with reference to FIGS. 10 and 11, in which similar elements to those in FIGS. 5 and 9 are identified by the same reference numerals and are identical in construction and in operation with the latter ones and accordingly no detailed description will be repeated for the sake of gravity.

FIG. 10 illustrates this invention as applied to the meter-out circuit, in which apertures or screw threads $24_1$ and $24_2$ contiguous to the outside of the valve proper $20_1$ are provided at both ends of the slide hole 24 (cylinder 7) and covers $27_1$ and $27_2$ are inserted into the apertures or screw threads $24_1$ and $24_2$ to form the cylinder 7 as in the foregoing examples. Further, two circumferential grooves $25_1$ and $25_2$ are provided and oil paths $5_{21}$ and $5_{22}$ are provided contiguous to the grooves $25_1$ and $25_2$. The oil paths $5_{21}$ and $5_{22}$ are contiguous together at the other end to the oil path $5_2$. Further, in the case of the meter-out circuit with the spring 12 inserted in the oil room $11_1$, the piston $10_2$ and the circumferential groove $25_2$ constitute the control throttle 13 in the same manner as that previously described. In this case, even if the piston $10_1$ shifts a little, the circumferential groove $25_1$ is entirely closed by the piston $10_1$ and the function of the control throttle cannot be performed. The other operations are exactly the same as those in the foregoing examples of the meter-out circuit.

FIG. 11 shows the case in which the flow control valve of this invention is used in the meter-in circuit, in which case the spring 12 is placed in the oil room $11_2$. The circumferential groove $25_2$ is completely closed by the piston $10_2$ but the other circumferential groove $25_1$ and the piston $10_1$ make up the control throttle 13. The other operations of this example are exactly the same as those of the examples of FIGS. 6 to 9.

In the examples of FIGS. 10 and 11 the throttle 22 is not a mere orifice but a variable throttle. It is also possible, of course, that the throttle 22 in the examples of FIGS. 5 and 9 is made variable as in the cases of FIGS. 10 and 11.

It will be apparent that many modifications and variations may be effected without departing from the scope of the novel concept of this invention.

I claim as my invention:

1. In a flow control valve comprising a flow control unit and a pressure adjustment unit for controlling substantially constant the flow rate of a fluid passing through the flow control unit by holding constant the difference between pressures of the liquid before and behind the flow control unit, which is characterized in that a branch duct line is provided in a duct line interconnecting the flow control unit with the pressure adjustment unit and throttle means is provided in the branch duct line whereby an additional amount of fluid is applied to the pressure adjustment unit through the throttle means together with the controlled amount of fluid flowing from the flow control unit.

2. A flow control valve as claimed in claim 1 which is inserted in a meter-out circuit.

3. A flow control valve as claimed in claim 1 which is inserted in a meter-in circuit.

4. A flow control valve as claimed in claim 1, wherein said throttle means is an orifice of a substantially constant cross-sectional area.

5. A flow control valve as claimed in claim 1, wherein said throttle means is variable in its opening.

6. A flow control valve as claimed in claim 1, wherein said interconnecting duct line has two branch duct lines one ends of which are connected to said interconnecting duct line and the other ends of which are connected to said pressure adjustment unit at different positions.